United States Patent [19]
Merriner et al.

[11] 3,743,240
[45] July 3, 1973

[54] VALVE ASSEMBLY
[75] Inventors: Delbert L. Merriner, Glendale; Woodrow W. Miller, Los Angeles, both of Calif.
[73] Assignee: Richdel, Inc., Los Angeles, Calif.
[22] Filed: Feb. 25, 1971
[21] Appl. No.: 118,657

Related U.S. Application Data
[63] Continuation-in-part of Ser. No. 875,378, Nov. 10, 1969, abandoned.

[52] U.S. Cl............... 251/129, 251/141, 335/262
[51] Int. Cl............. F16k 31/06, H01f 7/08
[58] Field of Search............... 251/129, 141; 335/260, 262

[56] References Cited
UNITED STATES PATENTS
| | | | |
|---|---|---|---|
| 2,842,400 | 7/1958 | Booth et al. | 251/331 X |
| 3,593,241 | 7/1971 | Ludwig | 251/141 X |
| 3,578,284 | 5/1971 | Martini | 251/129 X |
| 3,424,429 | 1/1969 | Monnich | 251/129 |
| 3,429,552 | 2/1969 | Huley et al. | 251/129 |

*Primary Examiner*—Arnold Rosenthal
*Attorney*—Jessup & Beecher

[57] ABSTRACT

An improved solenoid valve assembly is provided which is particularly suitable for vending hot liquids, such as coffee, from a vending machine. The solenoid valve is operated in a self-contained sealed unit, and it is insertable into a valve housing, for example, by a threaded engagement without the need of tools.

6 Claims, 3 Drawing Figures

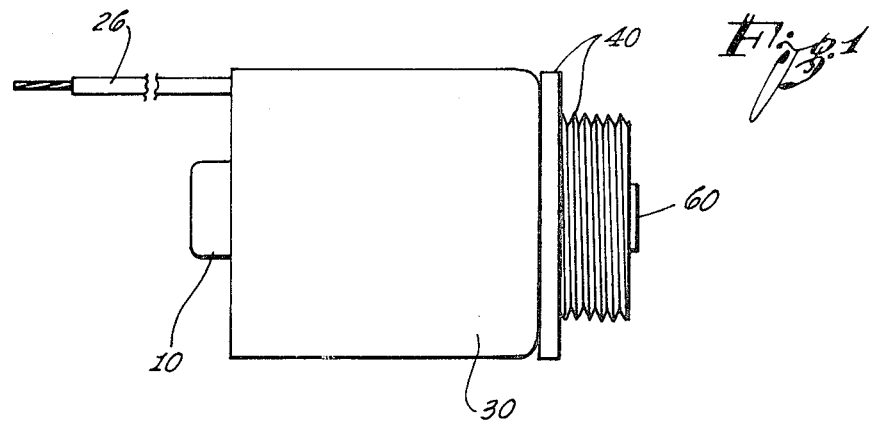
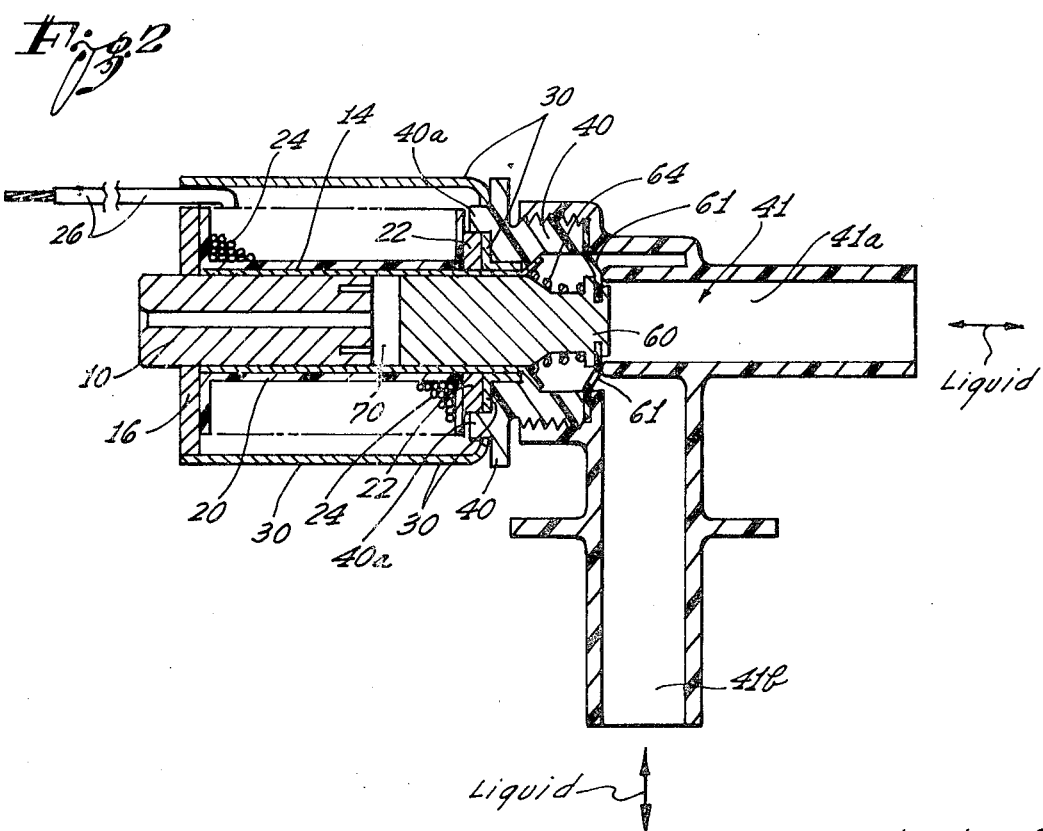

INVENTOR:
Delbert L. Merriner

VALVE ASSEMBLY

This application is a continuation-in-part of copending application Ser. No. 875,378 filed Nov. 10, 1969, and now abandoned.

BACKGROUND OF THE INVENTION

Valves used in conjunction with the usual type of vending machine must be capable of permitting hot liquid, such as coffee, to flow, by gravity, for example, from a 6 inch head, or less, and at a rate that should be of the order of 1 ounce per second.

The valve assembly of the present invention is an electrically operated solenoid valve which fulfills all the criteria set forth in the preceding paragraph. Moreover, the valve assembly of the invention fulfills the criteria most efficiently and by means of a relatively inexpensive unit that is capable of trouble-free operation over extended periods of time.

The valve assembly of the invention has the feature of being composed of a sealed unit which is threaded, or otherwise fitted, into the valve assembly, and which may be removed readily by hand for valve cleaning purposes. In addition, the valve assembly of the invention has no tendency to permit leakage or seepage of the liquid, or to permit the liquid to drip. The valve assembly is constructed so that no part of the valve mechanism is exposed to the liquid stream except the face of the plunger itself as it is seated with or unseated from the valve seat.

The solenoid valve mechanism used in the assembly of the present invention is of the same general type as the valve described and claimed in copending application Ser. No. 853,402 filed Aug. 27, 1969, now U.S. Pat. No. 3,598,360 in the name of the present inventor.

BRIEF DESCRIPTION OF THE DRAWINGS

FIG. 1 is a side view of a valve assembly embodying the concepts of the invention;

FIG. 2 is a side sectional view of the valve assembly of FIG. 1; and

DETAILED DESCRIPTION OF THE ILLUSTRATED EMBODIMENT

Figure 3:
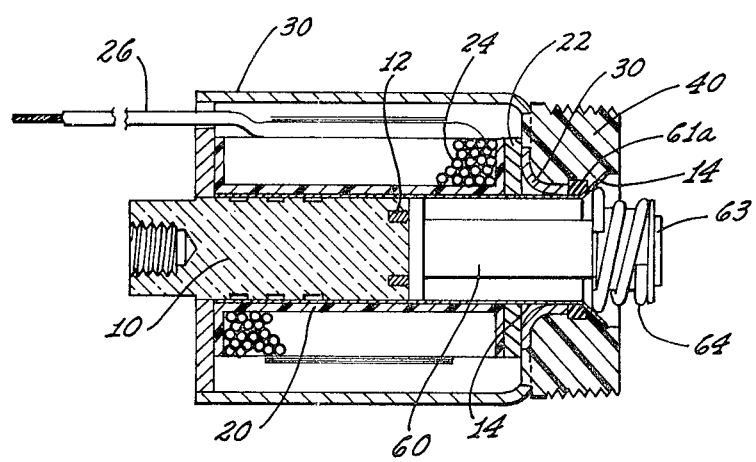
FIG. 3 is a side sectional view of a solenoid similar to the solenoid illustrated in the valve assembly of FIG. 1, but of a modified construction.

The illustrated valve assembly includes a central magnetic core section 10 which may, for example, be in the form of an elongated round rod composed, for example, of 426 F Series stainless steel. The lower end of the magnetic core section 10 has an annular slot, and a ring 12 of electrically conductive non-magnetic material, such as copper, is swedged into the annular slot. The ring 12 forms a shading ring for the magnetic core section 10, permitting the valve to be actuated by alternating current electrical energy.

The magnetic core 10 is inserted into a metallic sleeve 14 which may be composed of non-magnetic material, such as 303 Series stainless steel. An upper washer 16 formed, for example, of cold rolled steel, is fitted over the upper end of the magnetic core, for example, by a swedging action. The sleeve 14 is attached to the core 10 by a suitable adhesive, such as an epoxy resin. The upper end of the sleeve abuts against the washer 16.

A bobbin 20 formed, for example, of molded epoxy resin, is mounted on the sleeve 14. One end of the bobbin abuts against the washer 16. A further washer 22, which may be formed of cold rolled steel, is fitted over the sleeve 14 in a press friction fit therewith. The washer 22 abuts against the other end of the bobbin 20. An electrical energizing coil 24 is wound about the bobbin 20. The coil 24 is energized through leads 26 which extend through the washer 16.

A cup-shaped outer magnetic shell or casing 30 formed, for example, of cold rolled steel, is fitted over the sleeve 14. The side wall of the shell 30 extends around the winding 24 on the bobbin 10. The washer 16 closes the open end of the shell 30, and the upper peripheral edge of the shell may be coined over the rim of the washer to provide a unitary assembly. The washer 22 bottoms against the base of the shell 30, as shown. The sleeve 14 extends through a central opening in the base of the shell 30.

The base of the shell 30 is perforated to have a series of holes displaced radially from the aforesaid central opening. A molded thermosetting resin bushing 40 is fitted over the end of the sleeve 14, as shown. The bushing 40 has protuberances 40a which extend into the holes in the base of the shell 30 and which form an anti-torque anchoring means for the bushing. The end of the sleeve 14 is flared outwardly, as shown, to hold the bushing 40 in place on the end of the shell 30. The external surface of the bushing 40 is formed with threads so that the entire unit described above may be screwed into the end of the valve housing 41 merely by turning the shell 30.

The flared configuration of the sleeve 14, referred to above, also serves to facilitate the insertion of a plunger 60 into the sleeve in a slidable relationship therewith. The plunger 60 may be formed of appropriate magnetic material, such as 416 F Series stainless steel. The plunger slides axially in the sleeve in a close fit therewith.

A flexible web-like washer 61, formed of appropriate rubber-like material, is fitted into an annular groove on the end of the plunger 60 and is held between the end of the bushing 40 and the valve housing 41. The valve housing 41 has the illustrated configuration, and the outer edge of the washer 61 abuts against a shoulder in the valve housing when the unit described above is screwed into the valve housing. The washer 61 effectively seals the unit from the liquid flowing in the valve housing, and yet it permits movement of the plunger as the valve is opened and closed. If desired, the washer may be bonded over the end of the plunger 60.

The valve housing 41 includes a first tubular section 41a through which the inlet liquid flows, and it includes a second tubular section 41b, at right angles to the section 41a and through which the outlet liquid flows, although the liquid flow may be reversed. The plunger 60 seats the washer 61 against a valve seat formed by the inner extremity of the tubular member 41a.

The plunger 60 and washer 61 are normally seated on the aforesaid valve seat by means of a spring 64. The spring 64 is coiled around the plunger 60, and it engages a shoulder adjacent the end of the plunger, as shown. When the solenoid is energized, the alternating current flow through the coil 24 creates a magnetic field in the core 10, and in its related magnetic components. The shading ring 12, in a manner known to the art, then causes the core 10 to attract the plunger 60 towards it when the coil 24 is energized by alternating current, so that the plunger 60 and washer 61 are pulled away from the seat against the force of the spring 64. When the current is removed, the spring 64 again biases the plunger and washer against the valve seat.

The solenoid assembly may be fabricated in the manner described in the aforesaid copending application. It will be appreciated that the solenoid assembly may be threaded into the valve housing as a unit without the need for tools, and that it may easily be removed for cleaning the valve and housing.

It is apparent that the liquid in the valve housing does not contact the various elements of the solenoid, except the end of the plunger 60 and the sealing ring 61. When the solenoid is not energized the spring 64 holds the plunger 60 and washer 61 firmly against the seat in the valve housing 41, and there is no tendency for leakage or seepage to occur when the valve is closed, or for the valve to drip. However, when the solenoid is energized, a free opening is provided for the liquid to flow through the valve on a gravity basis and with a minimum of head requirements.

If so desired, a rubber tip may be attached to the end of the plunger 60 so that no metal whatever comes in contact with the fluid in the tubular sections 41a or 41b.

The stainless parts of the assembly may be passivated for maximum resistance to corrosion. The shading coil 12 may be nickel plated to avoid electrolysis.

The assembly is designed for very low temperature rise and can be operated continuously. The unit is capable of being used in conjunction with a variety of orifice sizes. It may be designed to operate on 24, 110 or 220 volts alternating current, for example, and direct current models also can be made.

A typical size, for example, of the solenoid assembly is of the order of 1-17/32 inch long and 1⅛ inch in diameter. These dimensions are given here merely for illustrative purposes.

In a constructed 24 V. A. C. model, the holding current is 0.24 amps and the inrush current is 0.48 amps. The temperature rise is of the order of 39° C., and the unit will operate in temperatures ranging from —40° to 180°F.

The solenoid shown in FIG. 3 is similar in most respects to the solenoid as shown in the valve assembly of FIG. 2, and like elements have been designated by the same numbers. In the solenoid of FIG. 3, a rubber tip 63 is attached to the end of the plunger 60, so that no metal will come in contact with the fluid flowing, for example, through the tubular sections 41a and 41b of FIG. 2. Also, in the assembly of FIG. 3, the resilient washer 61 is replaced by an O-ring 61a, the O-ring being inserted between the rolled over end of the tubular member, or sleeve 14 and the abutting end of the next section of the can or shell 30.

In the embodiment of FIG. 3, the magnetic core 10 is grooved to accept the epoxy which adhesively attaches the tube or sleeve 14 to the core. The shading ring 12 is installed and staked into the core, as in the previous embodiment. Likewise, the upper washer 16 is installed and staked to the core. The bobbin 20 which supports the coil 24 is mounted in slip-fit with the tube 14, and different size coils are available for various DC and AC voltages. The neck at the right hand of the can 30 engages the tube 14 in a press-fit.

The plastic bushing, or adapter nut 40, is available in various thread sizes, for different installations. In the construction of the assembly of FIG. 3, after the adapter nut 40 and O-ring 61a are in place, the right-hand end of the tube 14 is rolled over the O-ring, as shown, to lock and form a static seal for the solenoid assembly. It will be appreciated that the assembly of FIG. 3, like the solenoid of FIG. 2, are both fluid tight, insofar as the operating components of the solenoid are concerned.

The invention provides, therefore, an improved solenoid valve assembly, which is relatively inexpensive to construct, and which operates with a high degree of precision and satisfaction, for example, in vending machines or the like.

It will be appreciated, of course, that although particular embodiments of the invention have been shown and described, modifications may be made, and it is intended in the following claims to cover all modifications which fall within the spirit and scope of the invention.

What is claimed is:

1. A valve assembly including: a housing including a first tubular inlet section and a second tubular outlet section disposed in transverse relationship with one another, said first tubular section having an inner end defining a valve seat; and a solenoid unit removably mounted on said housing and including a reciprocally linearly movable plunger coaxial with said first tubular section and positioned selectively to seat against said valve seat, said solenoid unit including a rod-like core member coaxial with said plunger and normally axially spaced therefrom; a tube coaxial with said core member and said plunger and surrounding said core and said plunger, said tube being adhesively attached to said core, and said plunger being axially movable in said tube; a coil mounted on said tube in coaxial relationship therewith; a casing surrounding said coil in coaxial relationship therewith and having a necked end portion extending inwardly around one end of said coil towards said tube and axially along said tube in press-fit therewith; an adapter nut mounted adjacent said necked end portion of said casing, said tube having a radially outwardly flared end portion engaging said adapter nut and holding said adapter nut in position on said assembly.

2. The valve assembly defined in claim 1, in which said inlet section and said outlet section are disposed at right angles to one another.

3. The valve assembly defined in claim 1, and which includes a flexible web-like member surrounding the end of said plunger and sealing the solenoid unit from fluid in said valve housing.

4. The valve assembly defined in claim 1, in which said solenoid unit is threadably engaged with the end of said first tubular section in coaxial relationship therewith.

5. The valve assembly defined in claim 3, and which includes a coil spring in said solenoid unit surrounding said plunger and normally biasing said plunger and said web-like member against said valve seat.

6. The valve assembly defined in claim 1, and which includes an O-ring surrounding the end of said plunger and sealing the solenoid unit from fluid in said valve housing.

* * * * *